April 22, 1941.　　O. N. GREDELL　　2,239,442
VEHICLE TANK
Filed March 20, 1939　　3 Sheets-Sheet 1
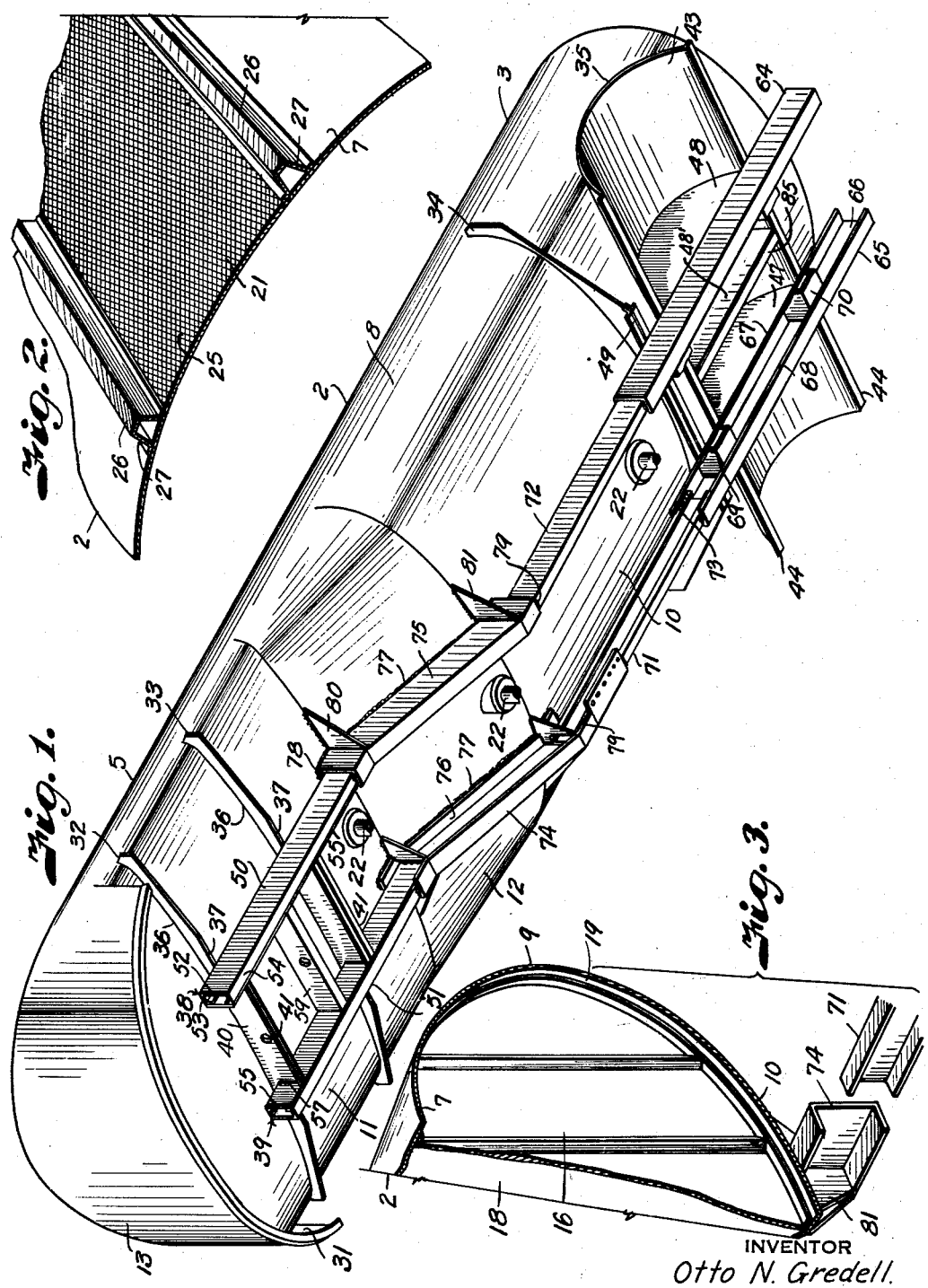
INVENTOR
Otto N. Gredell.
BY
Arthur C. Brown
ATTORNEY

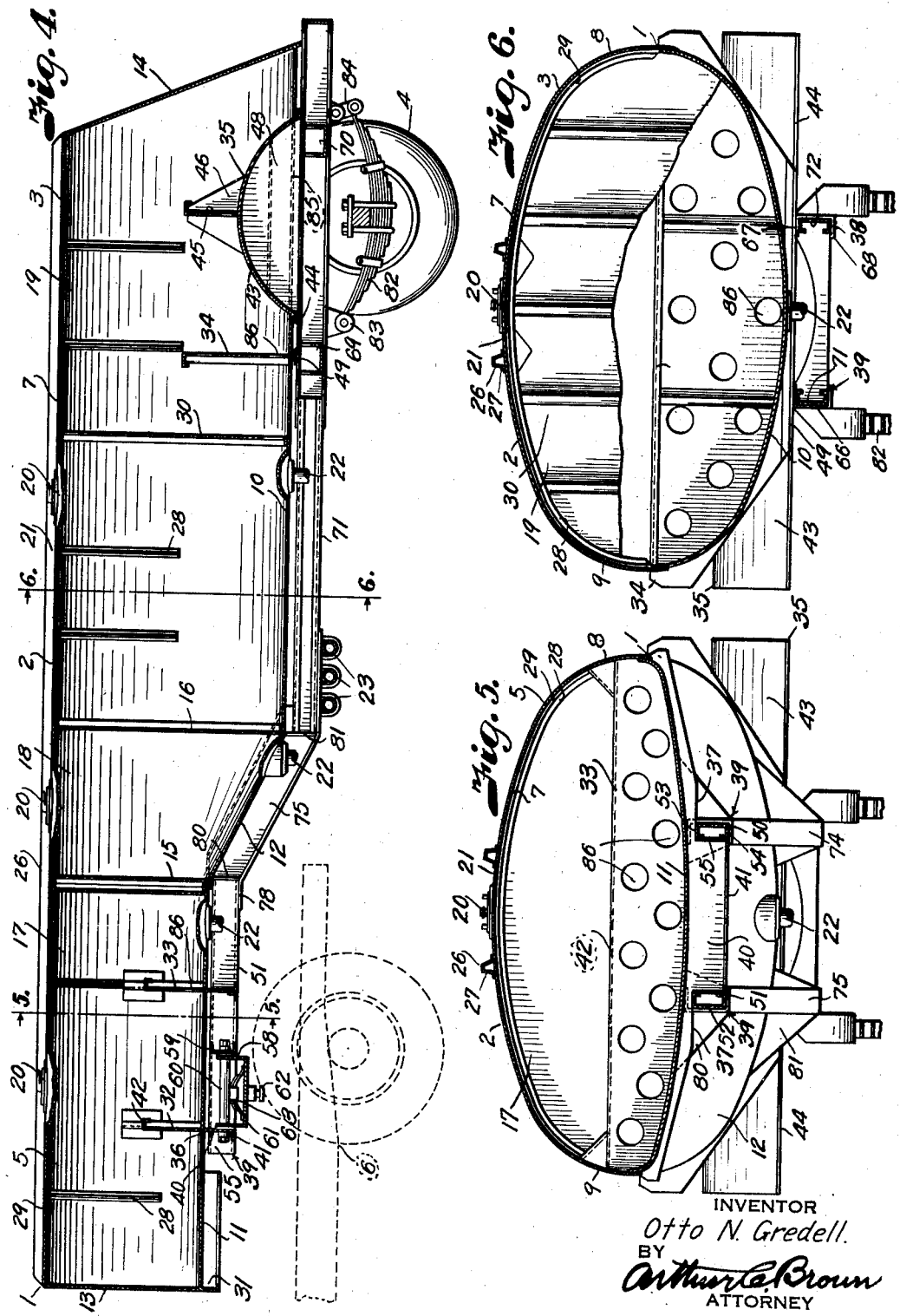

April 22, 1941.　　　O. N. GREDELL　　　2,239,442
VEHICLE TANK
Filed March 20, 1939　　　3 Sheets-Sheet 3
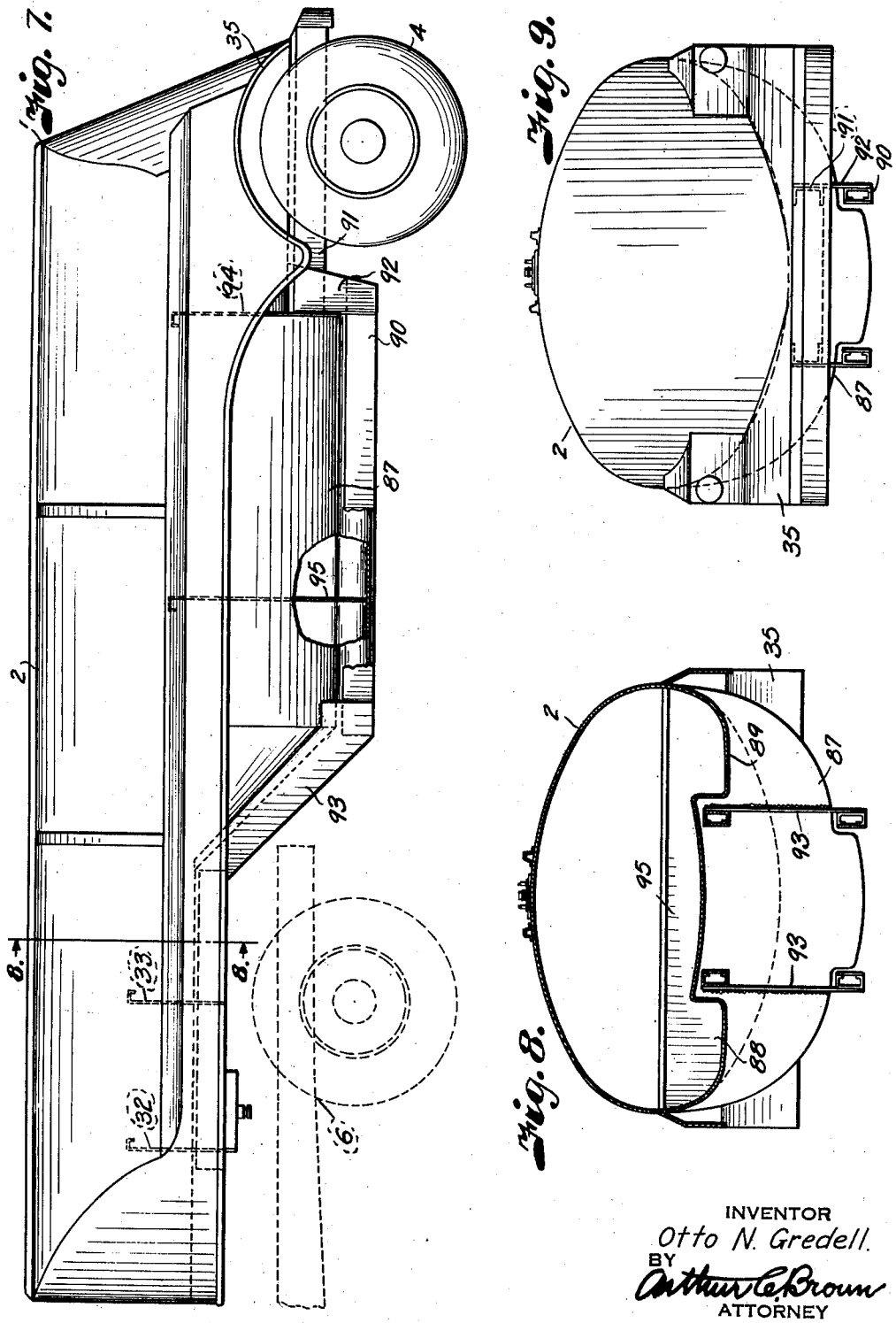
INVENTOR
Otto N. Gredell.
BY
Arthur C. Brown
ATTORNEY Patented Apr. 22, 1941

2,239,442

UNITED STATES PATENT OFFICE 2,239,442

VEHICLE TANK

Otto N. Gredell, Kansas City, Mo., assignor to Standard Steel Works, North Kansas City, Mo., a corporation of Missouri Application March 20, 1939, Serial No. 262,955

7 Claims. (Cl. 280—5)

This invention relates to vehicle tanks particularly applicable as straight trailer and semi-trailer units employed in transportation of liquids.

It has been the practice to mount tanks of this character on straight trailer or semi-trailer vehicles which were designed for supporting heavy live loads. This practice resulted in exceptionally large dead loads due to construction of the supporting vehicle so that the pay load was limited. More recently the trend is to a so-called frameless construction wherein the longitudinal supports are built within the interior of the tank and supplemented by a lighter exterior frame also formed as an integral part of the tank. While such construction has reduced the dead load to some extent, the interior frame reduces the pay load of a given sized tank and results in a complicated construction with a large amount of welding on the tank shell which produces internal stresses and buckling, aggravated by the draft forces acting through the tank structure.

The principal objects of the present invention are, therefore, to provide a tank with relatively light weight draft elements, capable of performing the necessary coupling between the tank supports and at the same time form longitudinal tension chords trussing the tank; to provide composite tension members which are pretensioned incidental to welding of the joints thereof; and to provide adequate distribution of impact forces acting on the tank and at the same time provide a low weight, high strength ratio.

Other objects of the invention are to provide a tank construction free of interior, longitudinal bracing and cross bracing, other than the partitions and cross girders; to provide a tank having a catwalk which constitutes a part of the tank shell and which is defined by exterior, longitudinal compression members which serve to prevent flexure of the catwalk and upper portion of the tank shell; and to provide an offset tank having drop portions to enlarge the load carrying capacity thereof.

In accomplishing these and other objects of the invention, as hereinafter pointed out, I have provided improved details of structure, the preferred forms of which are illustrated in the accompanying drawings, wherein:

Fig. 1 is an underneath perspective view of a tank constructed in accordance with the present invention.

Fig. 2 is a detail fragmentary section of the upper portion of the tank shell which includes the catwalk.

Fig. 3 is a detail cross-section through a portion of the tank showing one of the partitions.

Fig. 4 is a longitudinal section through the tank.

Fig. 5 is a cross-section through the forward offset portion of the tank on the line 5—5 of Fig. 4.

Fig. 6 is a similar cross-section through the rear portion of the tank on the line 6—6 of Fig. 4.

Fig. 7 is a side elevational view of a modified form of tank which is equipped with a drop center to enhance the load carrying capacity thereof.

Fig. 8 is a cross-section through the modified form of tank on the line 8—8 of Fig. 7.

Fig. 9 is a rear end view of the tank.

Referring more in detail to the drawings:

1 designates a semi-trailer unit constructed in accordance with the present invention, and which includes a tank shell 2 that has a rear portion 3 of substantially elliptical cross-section for support on wheels 4, and a forward offset portion 5 of substantially semi-elliptical cross-section for support on a tractor vehicle 6. The shell 1 is of welded construction and includes an upper crown portion 7 extending the entire length of the tank and merging into rounded side walls 8 and 9 connected by a reversely crowned bottom 10 extending the length of the rear portion 3. The side walls 8 at the front portion 5 are connected by a flatter bottom sheet 11 which is connected with the bottom 10 by an inclined throat sheet 12.

The ends of the tank are closed by suitable head sheets 13 and 14, and in the illustrated instance the tank is divided at the ends of the throat sheet 12 by partitions 15 and 16 to form compartments 17, 18 and 19. Each of the compartments is provided with suitable manholes 20 inset within the catwalk 21 that extends longitudinally of the top of the tank. The respective compartments are adapted to be drained through suitable ducts 22 having lateral outlets at the center of the tank as indicated at 23 (Fig. 4).

The catwalk 21 is formed by inserting a strip of metal having a tread surface 25, the side edges of the insert being welded to adjacent sheets forming the top of the tank. Extending along the sides of the insert are inverted channel-shaped strips 26, having leg portions 27 flanged outwardly and welded to the tank. The channels 26 thus define the sides of the catwalk and impart rigidity in the tank and prevent yielding of the shell when the operator walks therealong to manipulate the manhole covers. The channels 26 also serve as compression members to assist in maintaining alignment of the top of the tank. The top of the tank is further supported by bow-shaped members 28, spaced at suitable intervals between the partitions as shown in Fig. 4. The bows 28 preferably comprise T-bars having their base flanges 29 welded to the inner surface of the tank. The rear compartment 19 has a stiffening diaphragm 30 extending thereacross intermediate the partition 16 and the rear head 14. The head 13 is rounded as shown in Fig. 1, to avoid interference when the tractor turns with respect to the trailer, and provided with a depending skirt 31.

As previously mentioned, the tank is supported at its ends upon the rear wheels 4 and the tractor 6. The front and rear ends of the tank are therefore provided with pairs of transverse girders 32—33 and 34—35. The girders 32 and 33 consist of plates inset within slots 36 provided in the bottom and lower side walls so that the larger portion thereof projects within the tank, as shown in Figs. 4 and 5, the edges of the slots being welded to the respective faces of the girders. The lower edges of the girders project from the bottom of the tank to provide seating edges 37 resting on the forward ends of tension and draft members 38 and 39, later described. The girders also have depending web portions 40, the ends of which form right angles with the seating edges. Secured to the lower edges of the webs are angles 41 to enhance the rigidity thereof. The upper edges of the girders are flanged, as indicated at 42, to prevent buckling under load. The ends of the girders are connected by brackets with the side wall of the tank. The girder 34 substantially conforms in construction to the girders 32 and 33 but is of greater depth. The girder 35, however, is of different construction in that it constitutes a housing for the rear wheels 4. This girder includes an arch-shaped plate member 43 with its axis of curvature extending transversely of the tank and welded in an opening formed at the bottom thereof. The projecting side edges of the arcuate member are flanged outwardly, as indicated at 44. Extending along the center of the arch 43 is a plate extension 45, conforming to the upper portion of the girder 34. The plate 45 is braced with respect to the arcuate girder by gusset plates 46. Inset within the arch of the girder 35 are spaced plates 47 and 48 conforming in spacing to the width of the web portions 40 of the girders 32 and 33. The lower edge of the girder 34 also has reinforcing angles 49 fixed to the respective sides thereof in the plane of the flanges on the side edges of the arcuate girder, as shown in Figs. 1 and 4.

The longitudinal members 38 and 39 are of composite construction and include forward sections 50 and 51 extending from a short distance in front of the girder 32 to the throat 12. These sections are preferably formed of channels having their web portions 52 arranged vertically, and their upper and lower flanges 53 and 54 turned inwardly and connected by plates 55, the plates 55 being welded to the ends of the depending webs of the girder, as indicated at 57 in Fig. 1. The sections 50 and 51 thus cooperate with the transverse girders in supporting the front end of the tank so that the load impacts are sufficiently distributed through the girders and directed against the sections 50 and 51, which are in turn supported on a fifth wheel 58, as now to be described.

Connecting the sections 50 and 51, between the girders, is a cross channel 59 cooperating with the depending web of the girder 32 to mount a pivot shaft 60 which pivotally connects the forward end of the tank with a channel-shaped member 61 forming a bearing plate cooperating with a bearing plate on the chassis of the tractor vehicle, the respective plates being interconnected by a king-pin 62. The forward end of the tank is stabilized on the respective sides of the pivot shaft by springs 63. The members 38 and 39 also include rear sections 64 and 65, which are of channel form and arranged with their web portions 66 in the plane of the web portions of the channel sections 50 and 51, and with their flanges 67 and 68 turned inwardly, the upper flanges being secured, as by welding, to the angles 49 and flanges 44 of the girders 34 and 35.

The channel sections 64 and 65 are also connected by substantially channel-shaped cross members 69 and 70. Telescoped within the forward ends of the members 64 and 65 are lighter weight tensioning members 71 and 72, having their forward ends terminating adjacent the rear edge of the throat 12. The rear ends of the tensioning members 71 and 72 are welded into the channels 64 and 65 as indicated at 73. Fixed to the under side of the throat are connecting channels 74 and 75, having their upper flanges 76 welded to the throat as indicated at 77. The terminal ends of the channels 74 and 75 extend horizontally to form sockets for receiving the channels 50—51 and 71—72, which are welded therein as at 78 and 79 to form the horizontal channel sections into continuous members extending substantially the length of the tank. The connecting points of the channels 50—51 and 71—72 with the terminal ends of the inclined channels are braced with respect to the tank by suitable gusset plates 80 and 81. The sections comprising the longitudinal members 38 and 39, when welded together, shrink sufficiently so that they are placed in tension with respect to the tank shell and serve the purpose of the lower chord of a truss, of which the tank proper is analogous to an upper chord and the girders to the struts.

The springs 82, mounting the wheels 4, are connected with the channels 64 and 65 by spring shackles 83 and 84, as shown in Fig. 4. The longitudinal members 38 and 39 thus form a draft coupling between the rear wheels and the tractor vehicle.

Fluid is transferred from one side of the girder 43 to the other through ducts 85 extending alongside a plate 48' located intermediate the plates 47 and 48 as shown in Fig. 1. Fluid is transferred to the respective sides of the plate girders through openings therein as indicated at 86.

The form of the invention shown in Figs. 7 to 9 inclusive is similar to that of the preferred form, with the exception that the center of the tank has a drop portion 87 for increasing the capacity thereof. The sides of the offset at the front of the tank are also dropped below the longitudinal members, as indicated at 88 and 89 (Fig. 8). The longitudinal members are similar to those illustrated in the preferred form of the invention, however, the rear sections 90 and 91 thereof are offset and connected by gussets 92 and the angular connecting sections are shown as plates 93 instead of channels. The drop center of the tank has a rear girder 94 which projects through the tank and is connected with the gusset plates 92. The drop portion of the tank also has a similar cross member 95, however, this member does not extend through the tank and serves as a stay plate.

What I claim and desire to secure by Letters Patent is:

1. A vehicle tank of the character described including, an elongated shell, girders extending transversely through the shell in the front and rear ends thereof, a front pair of longitudinal members fixed to the front girders, a rear pair of longitudinal members fixed to the rear girders with the front ends of said rear members being spaced from the rear ends of the front members, tension members interposed between said ends of the pairs of members, and welds securing said ends of the front and rear members to the tension members, said shell having sufficient rigidity to restrain longitudinal expansion of said members when the welds are effected and to tension said members responsive to shrinking thereof after the welds have been effected for maintaining compression on said shell when the tank is empty.

2. A tank including, an elongated shell having an upwardly offset bottom at the front end thereof, girders extending transversely through the offset bottom at the respective ends of the shell, a front pair of longitudinal members fixed to the girders at the front of the shell, a rear pair of longitudinal members fixed to the girders at the rear of the shell, tension members interposed between the ends of said longitudinal members, and welds securing said ends of the front and rear members to the tension members, said shell having sufficient rigidity to restrain longitudinal expansion of said members when the welds are effected and to tension said members responsive to shrinking thereof after the welds have been effected for maintaining compression forces on the shell when the tank is empty.

3. A vehicle tank including, an elongated shell having an upwardly offset bottom at the front end thereof, a pair of girders extending transversely through the offset bottom at the front end of the shell, a pair of girders extending transversely through the rear end of the shell, a pair of longitudinal members welded to the girders at the front end of the shell, a similar pair of members welded to the girders at the rear end of the shell, a pair of longitudinal members fixed to the offset portion of said bottom and having ends connected to the forward pair of longitudinal members, tension members interposed between the rear ends of the members attached to said offset portion of said bottom and the forward ends of said longitudinal members at the rear end of the tank, and welds connecting said tension members with said longitudinal members, said shell having sufficient rigidity to restrain longitudinal expansion of said members when the welds are effected and to tension said members responsive to shrinking thereof after the welds have been effected for maintaining compression on the shell when the tank is empty.

4. A vehicle tank of the character described including, an elongated shell, a front pair of longitudinal members fixed to the front of the shell, a rear pair of longitudinal members fixed to the rear of the shell, and tension effecting means connecting the ends of said longitudinal members, said shell having sufficient rigidity to retain said tension and maintain compression forces in the shell when the tank is empty.

5. A vehicle tank of the character described including, an elongated shell, girders extending transversely through the shell at the front and rear ends thereof, a front pair of longitudinal members fixed to the front girder, a rear pair of longitudinal members fixed to the rear girder, and tension effecting means connecting the ends of said longitudinal members, said shell having sufficient rigidity to retain said tension and maintain compression forces in the shell when the tank is empty.

6. A vehicle tank of the character described including, an elongated shell, girders extending transversely through the shell at the front and rear ends thereof, a front pair of longitudinal channel members fixed to the front girder, a rear pair of longitudinal channel members fixed to the rear girder with the forward ends thereof spaced from the rear ends of the front pair of channel members, channel-shaped tension members having ends nesting the front and rear pairs of members, and welds connecting the nested ends of said members, said shell having sufficient rigidity to restrain longitudinal expansion of said channel members when the welds are effected and to tension said members responsive to shrinking thereof after the welds have been effected for maintaining compression forces in the shell when the tank is empty.

7. A vehicle tank of the character described including, an elongated shell having an upwardly offset bottom at the front end thereof, a pair of girders extending transversely through the offset bottom at the respective front and rear ends of the shell, pairs of longitudinal channel members connected with said front and rear pairs of girders, channel-shaped connecting members having ends sleeved relatively to the rear ends of said front pair of channel members and having welded connection with said offset portion of the shell bottom, channel-shaped tension members having ends sleeved with respect to the front ends of the rear longitudinal members and to the rear ends of the connecting channel members, and welds connecting said sleeved ends, said shell having sufficient rigidity to restrain longitudinal expansion of the members when the welds are effected and to maintain tension in said members responsive to shrinking thereof after the welds have been effected for maintaining compression on the shell when the tank is empty.

OTTO N. GREDELL.